Feb. 17, 1970  E. ANGEID  3,495,453
PILLOW BLOCK TENSIOMETER
Filed March 16, 1967
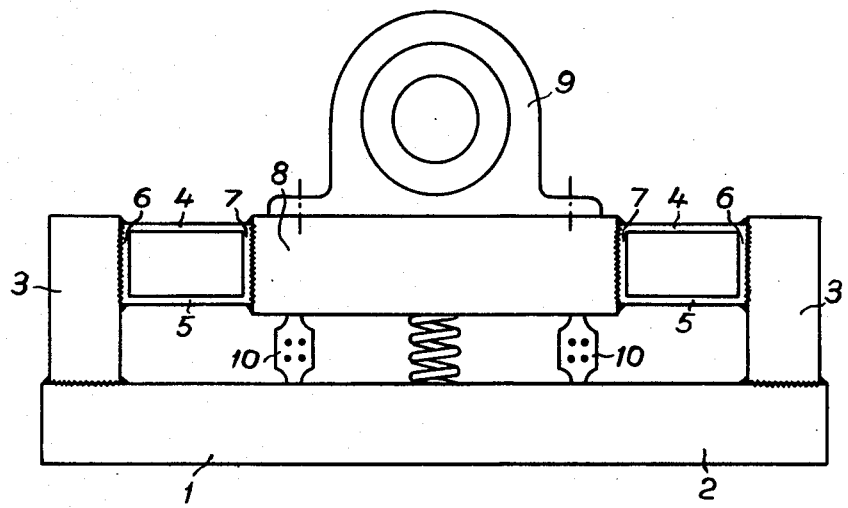
INVENTOR.
EGIL ANGEID
BY
Bailey, Stephens & Huettig
ATTORNEYS

# United States Patent Office 3,495,453
Patented Feb. 17, 1970

1

3,495,453
PILLOW BLOCK TENSIOMETER
Egil Angeid, Old Greenwich, Conn., assignor to Allmänna Svenska Elektriska Aktiebolaget, Vasteras, Sweden, a corporation of Sweden
Filed Mar. 16, 1967, Ser. No. 623,751
Int. Cl. G01l 5/12
U.S. Cl. 73—141     2 Claims

ABSTRACT OF THE DISCLOSURE

For measurement of the forces on a shaft bearing, the bearing is supported on a member supported in a frame by horizontal flexible members, with pressure sensing devices between the member and the frame of each side of the bearing.

BACKGROUND OF THE INVENTION

Field of the invention

The invention relates to a mechanism for measuring pressures, especially those exerted by a shaft.

Description of the prior art

A measuring device for measuring mechanical forces by the aid of magneto-elastic transducers usually includes a holder for the transducers. Such holders may be made by cutting from sheet iron of suitable thickness a number of slots so that resilient tongues are formed between which is an opening with two parallel sides between which the transducer is inserted. The resilient tongues support a load-carrying part, and one of the parallel sides is situated on the load-carrying part. The distance between the two parallel sides is somewhat less than that between the two faces of the transducer which are in contact with the two parallel sides of the holder when the transducer is inserted in the holder. When the transducer is to be inserted in the holder, the two parallel sides are pressed away from ecah other and the transducer is put in place. The elasticity of the resilient tongues will then keep the transducer in its right place in the holder.

In certain cases it is desirable to be able to place a bearing housing for a shaft above the load-carrying part and use the transducer for measuring the shaft load in the vertical direction. This is possible if only vertical forces occur but, if there are also considerable horizontal forces, a torque also arises in the load-carrying part which may cause complications and give rise to faulty measuring results.

SUMMARY OF THE INVENTION

The present invention relates to a measuring device for measuring mechanical forces in which the above indicated risks are eliminated. The holder consists of a U-shaped base part and a load-carrying part situated inside the base part and braced in the horizontal direction by tongues resilient in the vertical direction. The invention is characterised in that the load-carrying part is supported in the vertical direction by two pressure-sensing means arranged at substantially equal distances from the centre of the part. According to the invention a spring may also be arranged directly under the load-carrying part to effect suitable pre-stressing of the pressure-sensing means.

2

BRIEF DESCRIPTION OF THE DRAWING

The accompanying drawing shows a side view of the holder according to the invention.

DESCRIPTION OF THE PREFERRED EMBODIMENTS

The holder consists of a U-shaped base part 1, composed of a base plate 2 and two supports 3 attached to the base plate. Between these two supports the load-carrying part 8 is attached by means of elements 4 and 5 resilient in the vertical direction. These resilient elements form a rectangular box, open on two sides, where the other two opposite sides are designated 6 and 7. Side 6 is welded to one of the supports 3 and side 7 is welded to the load-carrying part 8. Above the load-carrying part a bearing housing 9 is arranged. The holder and bearing housing are supported in the vertical direction by two pressure-sensing transducers 10 arranged at a distance from each other and preferably placed symmetrically in relation to a vertical line through the centre of the bearing housing so that the load from the shaft through the bearing is equally distributed between the two transducers.

If the bearing housing is subjected to torsion or a horizontal side force, a torque arises on the load-carrying part 8. This causes one of the transducers 10 to be loaded more while the other is correspondingly unloaded so that the sum of these two alterations is zero, but at the same time better stability is obtained than if part 8 is supported by only one transducer.

In certain cases it may be suitable to arrange a prestressed spring 11 centrally between the transducers 10. This is particularly so if there are considerable horizontal forces (FH) or at negative counterweight loading, i.e. if the part 8 has a force directed upwards when it is at rest. It may then be suitable to use a tension spring to compensate this counterweight loading and to effect a certain pre-stressing of the transducers.

What I claim is:
1. A measuring device for measuring mechanical forces comprising a U-shaped base part comprising a horizontal base plate and a vertical support at each end of the base plate, a load carrying part located inside the base part, pairs of tongues which are resilient in a vertical direction, the two tongues of a pair being arranged at a distance from each other in a vertical plane, the tongues each having one end connected to one of the supports and one end to the load carrying part, and at least two pressure sensing transducers arranged between and in mechanical contact with the load carrying part and the base plate horizontally spaced in the direction of a line joining said pairs of tongues at substantially equal distances from the center of the load carrying part, whereby to compensate for lateral forces exerted on the load carrying part.
2. A device according to claim 1, a bearing housing on the upper side of the load carrying part.

References Cited

UNITED STATES PATENTS

| | | | |
|---|---|---|---|
| 2,681,566 | 6/1954 | Ruge. | |
| 2,802,660 | 8/1957 | Williams | 177—255 |
| 3,290,931 | 12/1966 | Fowkes et al. | |
| 3,366,190 | 1/1968 | Lau | 177—255 |

CHARLES A. RUEHL, Primary Examiner